United States Patent [19]

Murphy

[11] Patent Number: 4,496,374

[45] Date of Patent: Jan. 29, 1985

[54] COMPOUND AND PROCESS FOR DENATURING HIGH SOLIDS PAINTS

[75] Inventor: Donald P. Murphy, Madison Heights, Mich.

[73] Assignee: Parker Chemical Company, Madison Heights, Mich.

[21] Appl. No.: 467,282

[22] Filed: Feb. 23, 1983

[51] Int. Cl.$^3$ .............................................. B01D 47/00
[52] U.S. Cl. ........................................ 55/84; 134/38
[58] Field of Search ...................... 55/84, 85; 134/38; 98/115 SB; 106/286; 252/163, 164, 158, 162

[56] References Cited

U.S. PATENT DOCUMENTS

| | | | |
|---|---|---|---|
| 3,515,575 | 6/1970 | Arnold | 55/84 |
| 4,220,456 | 9/1980 | Block | 55/85 |
| 4,339,248 | 7/1982 | Garner | 55/84 |

FOREIGN PATENT DOCUMENTS

| | | | |
|---|---|---|---|
| 44493 | 4/1978 | Japan | 98/115.2 |
| 9066 | 1/1976 | Japan | 55/89 |

*Primary Examiner*—Bernard Nozick
*Attorney, Agent, or Firm*—Arthur E. Kluegel

[57] ABSTRACT

An improved composition and process for denaturing or "killing" captured high-solids paint particles in aqueous wash solutions employed in gas scrubbing devices such as paint spray booths for extracting entrained particulated contaminants from the exhaust air stream. The invention is based on the discovery of adding and dispersing wash solution insoluble particles of a relatively fine particle size in such aqueous wash solutions in amounts which are effective to coact with and coagulate the captured high-solids paint particles entrained in the wash solution effecting a denaturing thereof and converting them from a sticky adherent consistency to a nontacky putty-like consistency whereby they remain entrained in the wash solution and subsequently can be extracted by flotation and skimming. In accordance with a preferred embodiment, the particles comprise talc in which the predominant proportion thereof are of an average particle size less than about 15 microns and are employed in amounts generally ranging from about 10 pounds up to about 200 pounds per 1000 gallons of wash solution.

7 Claims, No Drawings

COMPOUND AND PROCESS FOR DENATURING HIGH SOLIDS PAINTS

BACKGROUND OF THE INVENTION

The present invention broadly relates to gas scrubbing devices for extracting contaminating particulate matter entrained in a gas stream employing a liquid washing medium. More particularly, the present invention is directed to an improved composition and process for denaturing high solids paint particles captured and entrained in an aqueous wash solution to effect a coagulation thereof and a flotation of the coagulated paint particles facilitating a separation and recovery from the aqueous wash solution.

Gas scrubbing devices of the various types well known in the art are extensively employed in paint spray chambers or booths for extracting particulate contaminating matter such as paint overspray particles during a paint spray operation from the recirculating air stream in order to provide an environmentally acceptable effluent for discharge to the atmosphere. Typical of such paint spray booth scrubbing devices are those such as described and illustrated in U.S. Pat. Nos. 3,119,675 and 3,782,080 the teachings of which are incorporated herein by reference. In essence, such air scrubbing devices employ various baffles, flood sheets, curtainous streams and/or spray patterns for extracting and capturing entrained particulated paint overspray particles from the air stream which become entrained in the aqueous wash water solution. In the spray application of conventional solvent-thinned coating compostions it has been conventional practice to incorporate various water soluble alkaline metal salts in the aqueous wash water to effect a denaturing or "killing" of the captured paint particles converting them from sticky substances to relatively dry putty-like agglomerates which tend to float in the recovery section of the apparatus facilitating removal or extraction thereof such as by skimming or the like. If the captured paint particles are not denatured, their sticky characteristics result in a progressive adherence and accumulation on the various surfaces of the water scrubbing apparatus and within the pipelines employed for recirculating the wash solution causing a progressive restriction in the flow of air and liquid through the apparatus significantly reducing the efficiency thereof and necessitating frequent shutdowns for cleaning and rejuvenation.

While such alkaline additive compounds of the types heretofore known have been satisfactory for denaturing conventional solvent-thinned coating formulations of the types heretofore known, such additives have been found ineffective and at times completely unsatisfactory for denaturing so-called "high-solids paints" which have been commercially introduced within the past few years for further reducing solvent emmissions in paint spray operations. The more stringent air regulations imposed by the Environmental Protection Agency (EPA) has occasioned the replacement of conventional solvent-thinned paint formulations usually containing less than about 45 percent by volume solids with the so-called high solids (or low-solvent) solvent-thinned coating compositions usually containing greater than 50 percent by volume solids, and more usually 60 percent or more by volume solids thereby attaining a substantial reduction in the quantity of organic solvent emissions to the atmosphere. In order to provide a sprayable viscosity at such lower solvent contents, such high-solid paint formulations contain polymers which are of a substantially smaller molecular weight in comparison to the molecular weight of polymers in conventional paint systems making them particularly tacky and difficult to denature employing additive agents of the types heretofore employed.

The present invention provides for a new additive agent for use in aqueous wash solutions of air or gas scrubbing devices and to a novel process for denaturing or killing captured high-solids paint particles entrained in such wash solutions thereby avoiding a progressive buildup of the contaminating paint on the structural sections of such scrubbing devices and further facilitating an extraction of the scrubbed paint constituents from the wash water facilitating a recirculation thereof.

SUMMARY OF THE INVENTION

The benefits and advantages of the present invention are achieved by introducing into an aqueous wash solution of the types employed in gas scrubbing devices, a controlled amount of substantially wash solution insoluble particles to provide a substantially uniform dispersion thereof which are present in an amount effective to coact with the captured high-solids paint particles in the wash solution effecting a coagulation thereof and rendering them denatured in which condition they do not tend to adhere to the surfaces of the scrubbing device and can more readily be recovered such as by flotation and skimming in the sump section of the scrubbing apparatus. The particulate matter which has been found satisfactory for use in accordance with the practice of the present invention includes talc, calcium oxide, calcium hydroxide, calcium cargonate, zinc stearate, as well as mixtures of the foregoing which can be effectively employed in amounts generally ranging from about 10 pounds up to about 200 pounds per 1000 gallons of wash solution. The effectiveness of the dispered particulate matter in the wash solution has been found enhanced when the predominant portion of the particles are of an average size less than about 15 microns. Particularly satisfactory results have been obtained employing talc particles at a concentration of about 40 to about 100 pounds per 1000 gallons of wash solution in which the predominant portion of the talc particles are less than about 15 microns.

In accordance with a preferred embodiment of the present invention, the particles, particularly talc particles are preliminarily admixed with a polyhydroxy compound such as a glycol compound of which ethylene glycol comprises a preferred material in an amount up to about 40 percent of the polyhydroxide compound based on the total weight of the mixture. The use of such polyhydroxy compound has been found to substantially facilitate the dispersion of the particulate matter in the wash solution forming a substantially uniform dispersion while at the same time reducing the dusting tendency of such materials during handling and also increasing their packing density.

Additional benefits and advantages of the present invention will become apparent upon a reading of the Description of the Preferred Embodiments taken in conjunction with the specific examples provided.

DESCRIPTION OF THE PREFERRED EMBODIMENTS

The present invention is specifically directed to the denaturing or killing of high-solids paint formulations in wash solutions employed in gas scrubbing devices, particularly, in paint spray booth devices. Because of the relatively recent advent of the technology associated with such high-solid coating formulations, no universal agreement has as yet been established as to the specific categorization and definition of such coatings. For the purposes of the present invention as herein defined and as set forth in the subjoined claims, high-solids coating formulations are intended to encompass solvent-based coating systems containing at least 50 percent by volume solids, and more particularly at least about 60 percent solids by volume and wherein the resinous binder constituents thereof are of substantially lower molecular weight than those contained in conventional solvent-based coating systems which contain less than about 50 percent solids by volume, and more usually about 45 percent or less solids by volume. By way of further background infomation regarding high-solids coating technology, reference is made to the following technical publications: "High-Solids Coatings: Past, Present, Future" by Robert N. Price, American Paint & Coatings Journal, June 21, 1982; "High-Solids Coatings" by John C. Dean, Modern Paint and Coatings, March, 1982; "Trends in Water-Borne, High-Solids Coatings" by Donald E. Brody, American Paint & Coatings Journal, July 12, 1982; and "High-Solids Acrylic Resins for Baking Enamels", by Dr. R. R. Kuhn, et al, Modern Paint and Coatings, April, 1981. The general teachings and descriptions as set forth in the foregoing technical publications are incorporated herein by reference.

It is believed that the appreciably lower molecular weight of the resinous constituents in such high-solids paints has rendered the conventional water wash solution soluble additive agents such as the various alkaline metal salts inoperative to effectively denature such captured paint particles causing rapid fouling and plugging of paint spray scrubbing devices. In accordance with the discovery of the present invention, the addition and dispersion of aqueous wash solution insoluble particulate matter of a controlled particle size and composition has been found to effectively coact with the captured high-solids paint particles effectively denaturing and coagulating such particles converting them into a putty-like physical condition in which they tend to float in quiescent sections of the scrubbing device enabling their simple extraction such as by skimming. The adoption of the present invention in water-wash paint spray booths employed for spray application of high-solids paints has been found to significantly reduce the accumulation of paint contaminants on the walls, surfaces and associated piping of such devices appreciably increasing the efficiency and operating life and significantly reducing the frequency of shutdown for maintenance and cleaning.

In accordance with the practice of the present invention, an effective denaturing of such high-solids paint particles in the aqueous wash solution is effected by dispersing in the wash solution a controlled amount of fine sized particles of which particles comprised of talc, calcium oxide, calcium hydroxide, calcium carbonate, zinc stearate as well as mixtures thereof have been found effective. Of the foregoing, talc particles have been found particularly effective and are also preferred because of economic considerations. The concentration of the particles in the wash solution will vary in consideration of the magnitude of paint overspray in the spray booth, the particular type of high-solids paint being sprayed and the loading or quantity of particulate matter in the air stream. Generally, particulate concentrations within a range of about 10 pounds up to about 200 pounds per 1000 gallons of wash solution have been found satisfactory with amounts of about 40 pounds to about 100 pounds per 1000 gallons being preferred. It has also been found, depending upon the specific chemical composition of the particle and the physical configuration thereof, that particular effectiveness in the denaturing of such high-solids paint particles is attained when the average particle size is predominantly less than about 15 microns. For example, in the case of talc, excellent denaturing of high-solids paints such as a high-solids taupe primer enamel commercially sold by Inmont Corporation under the designation U 28RK010 is attained when 95 percent of the talc particles are below about 15 microns. Moderately satisfactory denaturing has been observed when 95 percent of the talc particles are less than about 17 microns whereas when 95 percent of the talc particles are below about 30 microns in size, relatively poor denaturing is attained employing the foregoing high-solids primer enamel.

In accordance with a preferred practice of the present invention, the dry particulated substance is preferably admixed with a polyhydroxy glycol compound, preferably ethylene glycol, to provide a mixture containing up to about 40 percent by weight of the polyhydroxy compound, preferably about 15 percent to about 25 percent by weight of the polyhydroxy compound and typically about 20 percent by weight of the polyhydroxy compound. The addition of such polyhydroxy compound substantially facilitates the mixing and dispersing of the particular particulated agent in the aqueous wash solution and further reduces any dusting tendencies during the handling of the material. In the case of talc, the addition of about 20 percent by weight of ethylene glycol substantially increases the packing tendency of the finely particulated talc increasing drum capacity of about 400 pounds in comparison to only about 80 pounds per drum of the dry material.

A disperal of the particulated additive in the wash solution can conveniently be achieved at the suction side of the recirculation pump employed for recirculating the wash solution to the scrubbing device. The particulated agent is added to provide a net concentration of particles within the aforementioned concentrations in consideration of the concentration of particle additive in the recirculate wash solution.

In a typical air scrubbing device such as a tunnel paint spray booth employed for applying high-solids primers and topcoats to automobile bodies, air is drawn downwardly through a spray chamber at which paint is manually or automatically spray applied to the automobile body surfaces and the overspray paint particles become entrained in the air stream and pass through a floor grating into a scrubbing chamber there below in a manner as more fully described in the aforementioned United States patents. The scrubbing section of the paint spray booth is generally provided with inclined flood sheets over which the wash solution passes downwardly in the form of a continous sheet as supplied from a trough formed with an overflow wier connected to a supply header. The wash solution from the flood sheet generally passes over edges forming a curtainous liquid stream or spray through which the air stream passes in a serpentine manner as guided by a series of baffles to effect a progressive scrubbing and extraction of the liquid droplets from the air. The foregoing action may be further supplemented by spray nozzles to increase the efficiency of contaminant extraction. The resultant wash solution is conveyed from the base of the scrubbing device through a drain trough to sludge tanks in which the wash solution is quiescent enabling the extracted denatured paint to float to the surface in the form of a froth from which it can effectively be removed such as by skimming. The balance of the wash solution is recirculated from the sludge tanks through the recirculation pump back to the supply headers to the scrubbing section of the spray booth.

It will be appreciated that in addition to the particulated additive agent of the present invention, The aqueous wash solution can also contain conventional compatible additive agents such as anti-foaming agents, anti-corrosion additive agents, and the like of the types wellknown and employed in usual amounts.

In order to further illustrate the present invention, the following specific example is provided. It will be understood that the example is provided for illustrative purposes and is not intended to be limiting of the scope of the invention as herein described and as set forth in the subjoined claims.

EXAMPLE

An evaluation was made of various paint denaturing additives in a laboratory paint spray booth provided with a substantially upright flood sheet over which a continuous sheet of aqueous water solution is passed and against which an atomized spray of a high-solids taupe primer enamel was directed comprising a product designated as U 28RK010 available from Inmont Corporation.

In a first test, finely particulated calcium oxide was added to the aqueous wash solution at amounts of about 70 up to about 100 pounds per 1000 gallons and satisfactory denaturing of the paint was obtained. Similarly, finely particulated calcium hydroxide and calcium carbonate when employed at these same concentrations produced effective paint denaturization. Zinc stearate particles at a concentration of about 50 pounds per 1000 gallons also provided satisfactory paint denaturization. The use of fine sized talc particles in which 95 percent were below about 15 microns at a concentration of 40 pounds per 1000 gallons provided excellent denaturing of the high-solids paint.

In contrast, the dissolving of from about 10 to 200 pounds per 1000 gallons of an alkaline salt mixture of the types heretofore conventionally employed including soluble salts such as caustic soda, sodium meta silicate, sodium carbonate, alkali metal phosphates and the like in the aqueous wash solution had no appreciable effect on the denaturing of high-solids paint particles in the wash solution. Similarly, the dispersal of from 10 to 200 pounds per 1000 gallons of insoluble particles of aluminum stearate and cobalt carbonate did not effect any significant denaturing of the paint.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A process for denaturing captured high-solids paint particles entrained in an aqueous wash solution of a gas scrubbing device comprising the steps of contacting paint overspray particles entrained in a gas stream with an aqueous wash solution consisting essentially of water and a dispersion of substantially wash solution insoluble talc particles predominantly of a particle size of less than about 15 microns present in an amount effective for coagulating the captured high-solids paint particles and effecting a denaturing thereof.

2. The process as defined in claim 1 in which the concentration of said talc particles in the wash solution is about 10 to about 200 pounds per 1000 gallons of wash solution.

3. The process as defined in claim 1 in which the concentration of said talc particles in the wash solution is about 40 to about 100 pounds per 1000 gallons wash solution.

4. The process as defined in claim 1 including the further step of removing the coagulated denatured high-solids paint particles from the wash solution.

5. The process as defined in claim 1 including the further step of preliminarily mixing said talc particles with a polyhydroxy wash solution soluble compound in an amount up to about 40 percent by weight of the total talc particle mixture to facilitate the addition and dispersion of said talc particles in the wash solution.

6. The process as defined in claim 5 in which said polyhydroxy compound comprises ethylene glycol.

7. The process as defined in claim 5 in which said polyhydroxy compound is present in an amount of about 15 to about 25 percent by weight of the total talc particle mixture.

* * * * *